May 21, 1940. H. P. WILLIAMS ET AL 2,201,463
INSECT EXTERMINATING DEVICE
Filed Dec. 31, 1938

Inventors
Hubert P. Williams
Archie T. Williams

By Jack A. Ashley
Attorney

Patented May 21, 1940

2,201,463

UNITED STATES PATENT OFFICE 2,201,463

INSECT EXTERMINATING DEVICE

Hubert P. Williams, Stamford, and Archie T. Williams, Doole, Tex.

Application December 31, 1938, Serial No. 248,778

2 Claims. (Cl. 43—140)

This invention relates to new and useful improvements in insect exterminating devices.

One object of the invention is to provide an improved device which may be readily mounted on a tractor or other portable machine, and which is arranged to be moved over plants, such as cotton or the like, to remove insects from said plants, said device also having means for exterminating the insects so removed.

An important object of the invention is to provide an improved insect exterminating device which employs a combined suction and air pressure for removing insects from plants, the arrangement being such that said insects may be positively removed from any height plant without damage to the plant; said device also utilizing the blower fan which creates the suction and pressure as a means for exterminating the insects which are removed from the plants, whereby an auxiliary exterminating means is unnecessary.

A further object of the invention is to provide an improved device of the character described, which is movable over the plants from which insects are to be removed and which includes a suction conduit disposed directly over the plant, with air conduits on each side and at the lower end of the plant, whereby air under pressure is directed upwardly through said plant, which air aids the suction in removing the insects from the plant and carrying them to the suction conduit.

Another object of the invention is to provide an improved insect removing and exterminating device wherein the insects are drawn into the blower fan and are exterminated and disintegrated therein, after which they are re-circulated through the device and into contact with plants from which additional insects are to be removed, whereby said disintegrated insects aid in removal of other insects from the plants.

A construction designed to carry out the invention will be hereinafter described, together with other features of the invention.

Figure 1:
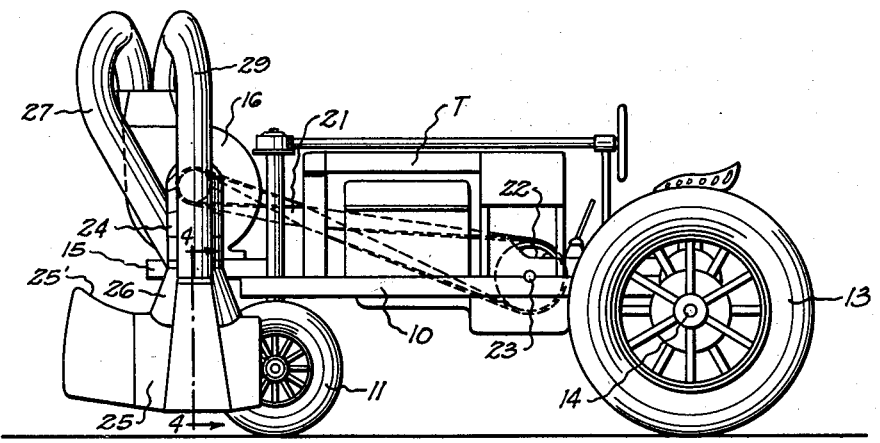
Figures 2, 4:
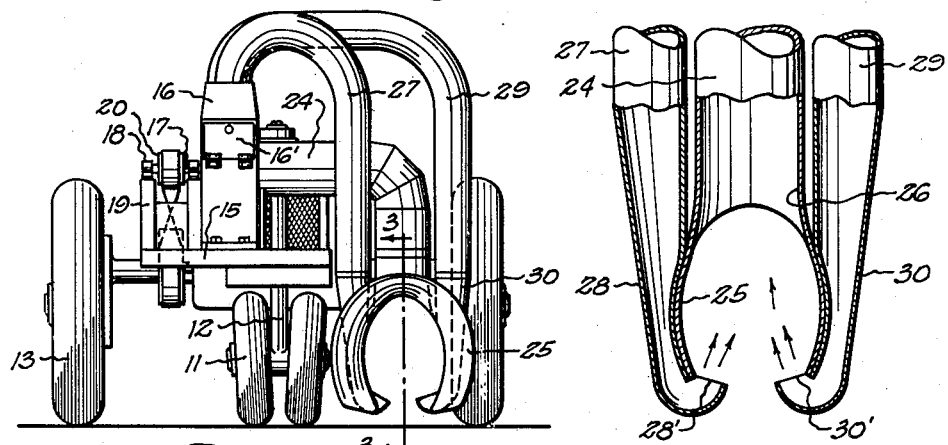
Figure 3:
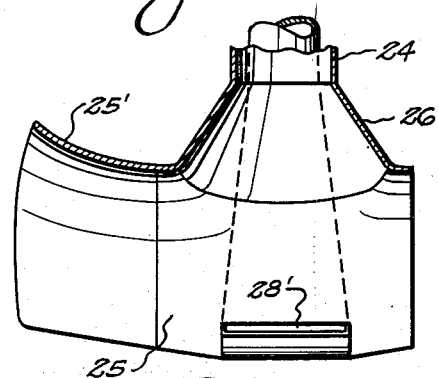

The invention will be more readily understood from a reading of the following specification and by reference to the accompanying drawing, in which an example of the invention is shown, and wherein:

Figure 1 is a side elevation of an insect removing and exterminating device, constructed in accordance with the invention, and showing said device mounted on a tractor, Figure 2 is a front elevation of the same, Figure 3 is a transverse, vertical, sectional view taken on the line 3—3 of Figure 2, and Figure 4 is a vertical, sectional view taken on the line 4—4 of Figure 1.

In the drawing, the letter T designates a tractor or other similar machine which is adapted to be moved over the ground. The tractor includes the usual frame 10 and is provided with a pair of forward or front wheels 11 which are supported by a suitable hanger 12 depending from said frame. Rear ground wheels 13 are mounted on the rear axle 14, suitably supported in the frame in any desired manner, and said rear wheels are of a larger diameter than the front wheels and are spaced further from each other. This construction is usual and forms no part of the present invention, it being particularly noted that any desired machine may be employed.

A forwardly extending platform 15 is mounted on the forward end of the frame and this platform serves to support the casing 16 of a blower which may be bolted, or otherwise fastened thereto. The casing 16 houses the usual impeller or fan (not shown) and the shaft 17 on which said impeller is mounted extends outwardly from one side of said casing. This extending or projecting end of the shaft 17 is supported or journaled in suitable bearing collars 18 which rest on upstanding posts 19 mounted on the platform 15. A pulley 20 is fastened on the shaft 17 between the bearing collars 18 and an endless drive belt 21 passes over this pulley. The drive belt also passes over a drive pulley 22 which is secured on a shaft 23. The shaft 23 is connected with the usual power take-off of the tractor and, obviously, when the engine or motor of said tractor is operated, the shaft 23 is rotated to rotate the drive pulley 22. Rotation of the pulley 22 imparts a rotation, through the drive belt 21, to the pulley 20, whereby the shaft 17 is revolved. As the shaft 17 revolves, the impeller or fan (not shown) which is secured thereon within the blower casing 16 is rotated.

A suction conduit 24 has one end connected in the side of the blower casing or housing 16 and this conduit extends laterally from the casing, as shown in Figure 2. The conduit is then bent downwardly and has its lower end connected in the top of a hood 25 by means of a transition 26. The hood 25 is elongate and the transition 26 is connected nearer the rear end of said hood. The upper surface or top of the hood curves upwardly from the transition, as shown at 25'. The hood is substantially U-shaped in cross-section, as is clearly shown in Figure 2, and the lower end of said hood is spaced a slight distance from the ground. When the shaft 17 is rotating and the blower operated, a suction is set up or created within the conduit 24 and, obviously, any material within the hood 25 will be drawn upwardly through the conduit and into the blower casing 16. An air outlet flue or pipe 27 has one end connected to the upper or outlet end of the blower casing 16 and this pipe curves downwardly so as to extend contiguous to the suction conduit 24. The lower end of the pipe 27 is connected with a tapered nozzle which extends downwardly on one side of the U-shaped hood 25. The lower end of the nozzle 28 projects below the bottom of the hood 25 and is curved upwardly, as is clearly shown in Figure 4, whereby the outlet end 28' of said nozzle is located within the hood 25. With this arrangement, it will be seen that the air which is forced from the blower casing will pass through the pipe 27 and downwardly to the tapered nozzle 28. This air, under pressure, will be turned upwardly due to the curvature of the lower end of the nozzle 28 and will escape through the outlet 28'. Due to the curved lower end of the nozzle, this air, under pressure, will be directed upwardly between the side walls of the hood 25 and into the suction conduit 24.

A second air outlet pipe or flue 29 is also connected in the outlet end of the blower casing 16 and is curved so as to extend downwardly on the opposite side of the suction conduit 24. The lower end of the flue 29 is connected to a nozzle 30, similar in construction to the nozzle 28. The nozzle 30 extends downwardly along the outer surface of the hood 25 on the side opposite the nozzle 28. The outlet opening 30' of the nozzle 30 is disposed at the lower end of the hood 25 and is arranged to direct the air escaping from the nozzle upwardly through the hood and into the suction conduit 24.

From the above, it will be seen that when the blower is operating, a suction is created in the conduit 24, whereby any material within the hood 25 is acted upon by this suction. At the same time, air, under pressure, is forced through the pipes 27 and 29 and is ejected from the nozzles 28 and 30, upwardly through the hood 25 and into the suction conduit 24. In this manner, the air, under pressure, which is ejected from the nozzles aids the suction in moving any loose material within the hood 25 upwardly into the suction conduit.

The location of the blower, together with the curvature of the suction conduit 24 and pipes 27 and 29, disposes the hood 25 at the forward end of the tractor and at one side of the front wheels 11. However, it is pointed out that the hood may be located at the rear of the tractor or in any convenient position thereon. As the tractor moves forwardly, the U-shaped hood 25, which is located in close proximity to the ground, passes over and more or less encloses the plant from which the insects are to be removed. As the tractor moves forwardly to move the hood along the row of plants, the drive pulley 22 rotates the pulley 20 through the drive belt 21 as has been explained, whereby the blower within the casing 16 is operated.

As the blower operates, it creates or sets up a suction in the line 24, whereby the suction acts on the insects which are on the plant beneath the hood 25. At the same time, the blower forces air under pressure through the lines 27 and 29 and this air is ejected upwardly between the side walls of the hood and, therefore, upwardly through the plant being acted upon. This air under pressure aids the suction in forcing the insects from the plant and upwardly into the conduit 24. It is noted that the direction of air under pressure is longitudinally of the plant and, thus, the entire plant is acted upon or contacted by this air flowing under pressure. Such arrangement assures that the insects throughout the entire length of the plant are removed.

The insects are drawn upwardly through the suction conduit 24 and into the fan (not shown) within the blower casing 16. Since this fan is rotating at a relatively high speed, it will serve to disintegrate and exterminate the insects drawn into the casing 16. The dead insects are then re-circulated through the pipes 27 and 29 and are ejected from the nozzles 28 and 30 with the air under pressure. The disintegrated insects will strike the plant and will aid in removing other live insects therefrom, after which air is again drawn into the suction fan and the cycle repeated. In this manner, the insects after being killed in the blower are re-circulated and serve to aid in removing live insects from the plants over which the hood 25 is moved. If it is desired to remove the dead insects from the blower casing 16, this may be done through a suitable door 16' formed in one side of said casing and provided for the purpose.

It is noted that the forward end of the hood 25 is curved upwardly to facilitate the hood passing over the plant. Also, the hood is flared outwardly at its forward end so as to guide the plant between the side walls of said hood. It is further pointed out that the hood may be of any suitable size so that it may be passed over any height of plant. In all cases, the air under pressure, which aids the suction in removing the insects, is directed upwardy and longitudinally of the plant, and substantially throughout the entire length of said plant. Such arrangement positively assures the removal of all insects from said plant.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. An insect removing and exterminating device including, a substantially U-shaped hood arranged to be moved over a row of plants, a suction conduit connected in the top of the hood and extending upwardly therefrom, a blower fan connected with the conduit for creating a suction therein to draw the insects from the plant into the blower wherein they are disintegrated and exterminated, an air flue leading from the outlet side of the blower to the lower end of the hood, whereby air under pressure is forced through said pipe, and a nozzle on the end of said flue for directing the air under pressure upwardly through the hood and longitudinally of the plant, whereby said air under pressure aids in removing the insects from the plant and forcing them into the suction conduit.

2. An insect removing and exterminating device including, a substantially U-shaped hood arranged to be moved over a row of plants, a suction conduit connected in the top of the hood and extending upwardly therefrom, a blower fan connected with the conduit for creating a suction therein to draw the insects from the plant into the blower wherein they are disintegrated and exterminated, a pair of air flues leading from the outlet end of the blower and extending downwardly on opposite sides of the hood, a nozzle connected with each flue and disposed so as to direct the flow from the flues upwardly through the hood, whereby when the blower is operating air under pressure together with the disintegrated insects from the blower are directed longitudinally of the plant to aid the suction in removing said insects.

HUBERT P